(12) United States Patent
Kitazume et al.

(10) Patent No.: US 7,267,835 B2
(45) Date of Patent: Sep. 11, 2007

(54) SWEETENER AND PROCESS FOR PRODUCING THE SAME

(75) Inventors: Masato Kitazume, Chiba (JP); Tadashi Katabami, Hunabashi (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 225 days.

(21) Appl. No.: 10/245,383

(22) Filed: Sep. 18, 2002

(65) Prior Publication Data

US 2003/0138538 A1 Jul. 24, 2003

(30) Foreign Application Priority Data

Sep. 21, 2001 (JP) ............................. 2001-289166

(51) Int. Cl.
*A23L 1/236* (2006.01)
(52) U.S. Cl. ...................................... 426/548; 426/658
(58) Field of Classification Search ................ 426/548, 426/658, 661
See application file for complete search history.

(56) References Cited

U.S. PATENT DOCUMENTS 4,590,160 A 5/1986 Nishihashi et al. ........... 435/78

FOREIGN PATENT DOCUMENTS

| JP | 57-18779 | 4/1982 |
| JP | 58-94367 | 6/1983 |
| JP | 2-163056 | 6/1990 |
| JP | 9-107913 | 4/1997 |

OTHER PUBLICATIONS

Osamu Tanaka, Improvement of Taste of Natural Sweeteners, Pure & Appl. Chem., vol. 69, No. 4, pp. 675-683, 1997.*

Abstract JP 02131592 published May 21, 1990; Full English translation of Japanese Application.
Database WPI-XP-002227851; KR9404526B; May 25, 1994.
Abstract JP 02131592 published May 21, 1990.
Database WPI—XP-02227855; JP19880078134 dated Oct. 11, 1989.
Database WPI—XP-002227850; JP19810191497 dated Jun. 4, 1983.
European Search Report dated Feb. 4, 2003.

* cited by examiner

*Primary Examiner*—Arthur L. Corbin
(74) *Attorney, Agent, or Firm*—Edwards Angell Palmer & Dodge LLP (57) ABSTRACT

The present invention provides a sweetener which has mild sweetness like sugar while maintaining a high sweetness intensity of a Stevia sweetener and also has a sharp head-taste of sweetness, a sharp after-taste of sweetness, as well as reduction of the bitterness and astringency of after-taste peculiar to the Stevia sweetener, and a process for producing the same. The sweetener contains steviol glucosides comprising β-1,4-galactosyl rebaudioside A having one to three β-1,4-bonded galactosyl groups in a molecule and rebaudioside A, wherein the following expressions (1) and (2) are satisfied:

$$[(GRA+RA)/(X)] \geqq 0.4 \qquad (1)$$

$$[(GRA)/(RA)] \geqq 1.0 \qquad (2)$$

wherein GRA represents the weight percentage of the β-1,4-galactosyl rebaudioside A having one to three β-1,4-bonded galactosyl groups in a molecule, RA represents the weight percentage of the rebaudioside A, and X represents the weight percentage of the steviol glucosides.

19 Claims, 2 Drawing Sheets

SWEETENER AND PROCESS FOR PRODUCING THE SAME

BACKGROUND OF THE INVENTION

1. Field of the Invention

The present invention relates to a sweetener which has a high sweetness intensity and excellent sweetness quality and also contains, as a main component, rebaudioside A and β-1,4-galactosyl rebaudioside A which are useful as sweeteners for various foods and drinks, and to a process for producing the same.

2. Description of Related Art

Heretofore, sugar (sucrose) has widely been used as a sweetener for foods and drinks. In particular, coffee drinks, including canned coffee, and carbonated beverages contain large amounts of sugar. Recently, because of the trend of increasing interest in health and low calorie foods and drinks, there is a tendency for ingestion of sugar, which can cause obesity, diabetes, and dental caries, to be reduced, and a sweetener having a high sweetness intensity is replaced by sugar.

Such a sweetener having a high sweetness intensity is a Stevia sweetener derived from an extract of a perennial plant, of the aster family, originating in Paraguay, South America, for example, *Stevia rebaudiana* BERTONI.

A Stevia sweetener obtained from the extract of Stevia plants (hereinafter referred to as a Stevia extract) has a sweetness, which is hundreds times stronger than that of sugar, but has a characteristic that the sweetness sensation is produced more slowly than that of sugar, that is, the so-called "head-taste of the sweetness" is delayed, and also has a characteristic that the sweetness remains comparatively longer, that is, so-called "after-taste of sweetness" is prolonged. When using a large amount of stevioside contained in the Stevia sweetener in coffee drinks and carbonated beverages, consumers clearly experience discomfort because of a peculiar astringency and bitter after-taste, in addition to the sweetness.

Therefore, various research has been conducted to improve the sweetness quality of the Stevia sweetener. For example, Japanese Unexamined Patent Application, First Publication No. Sho 58-094367 discloses a process for preparing a sweetener containing, as a main component, β-1,4-galactosyl stevioside resulting from the β-1,4 bonding of a galactosyl group to stevioside, which comprises allowing a β-1,4-galactosyl transferase to react on an aqueous solution containing a Stevia extract containing stevioside as a main component and a β-1,4-galactosyl sugar compound.

According to this process, the sweetness is improved to become a mild sweetness and the prolonged after-taste of sweetness is relatively improved, and also the bitterness and astringency are reduced, while the effect of improving the sweetness quality is not sufficient, and the resulting sweetener is still insufficient for use in coffee drinks and carbonated beverages.

Also, Japanese Unexamined Patent Application, First Publication No. Hei 9-107913 discloses a process for the α-addition reaction of glucose to a Stevia extract containing rebaudioside A as a main component. However, there arose a problem in that the enzyme reaction proceeds to form a long glucose chain from glucose added to rebaudioside A, thus reducing sweetness intensity of the resulting α-glucosyl rebaudioside A by about 45% as compared with rebaudioside A.

As described above, the sweetness quality of a conventional sugar-added Stevia sweetener is improved to some extent by the addition of sugar, while the sweetness intensity is reduced and defects peculiar to the Stevia sweetener, for example, the delayed head-taste of sweetness as well as an after-taste with bitterness and astringency are not completely improved, and thus consumers feel discomfort when using the Stevia sweetener in coffee drinks and carbonated beverages.

BRIEF SUMMARY OF THE INVENTION

An object of the present invention is to provide a sweetener which has mild sweetness like sugar while maintaining a high sweetness intensity of a Stevia sweetener, and also has a sharp head-taste of sweetness, a sharp after-taste of sweetness, as well as reduction of the bitterness and astringency of after-taste peculiar to the Stevia sweetener, and a process for producing the same.

The present inventors have intensively researched and discovered the following.

(A) A sweetener, wherein the weight percentage of β-1,4-galactosyl rebaudioside A having one to three β-1,4-bonded galactosyl groups in a molecule (GRA), the weight percentage of rebaudioside A (RA) and the weight percentage of steviol glucosides (X) have a specific relationship, is a sweetener which has mild sweetness like sugar and also has a sharp head-taste of sweetness, a sharp after-taste of sweetness, as well as reduction of the bitterness and astringency of after-taste peculiar to the Stevia sweetener.

(B) β-1,4-galactosyl rebaudioside A having one to three β-1,4-bonded galactosyl groups in a molecule can inhibit the sweetness from being reduced by about 30% as compared with rebaudioside A because the addition polymerization of the galactosyl group to the galactosyl group added to rebaudioside A does not occur.

(C) The above sweetener can be easily prepared by allowing a β-1,4-galactosyl transferase to react on an aqueous solution containing a Stevia extract containing 40% by weight or more of rebaudioside A and a β-1,4-galactosyl sugar compound in a 5- to 20-fold amount based on the solid content of the Stevia extract.

The present invention has been completed based on the above knowledge.

Thus, the present invention provides a sweetener which contains steviol glucosides comprising β-1,4-galactosyl rebaudioside A having one to three β-1,4-bonded galactosyl groups in a molecule and rebaudioside A, wherein the following expressions (1) and (2) are satisfied:

$$[(GRA+RA)/(X)] \geq 0.4 \qquad (1)$$

$$[(GRA)/(RA)] \geq 1.0 \qquad (2)$$

wherein GRA represents the weight percentage of the β-1,4-galactosyl rebaudioside A having one to three β-1,4-bonded galactosyl groups in a molecule, RA represents the weight percentage of the rebaudioside A, and X represents the weight percentage of the steviol glucosides.

Also, the present invention provides a process for preparing a sweetener, the process comprising allowing a β-1,4-galactosyl transferase to react on an aqueous solution containing a Stevia extract containing 40% by weight or more of rebaudioside A and a β-1,4-galactosyl sugar compound in a 5- to 20-fold amount based on the solid content of the Stevia extract.

The present invention exerts the effects described below.

Since the sweetener of the present invention has such a relationship that a ratio of the total of the weight percentage of β-1,4-galactosyl rebaudioside A contained in the sweetener (GRA) and the weight percentage of rebaudioside A contained in the sweetener (RA), (GRA+RA), to the weight percentage of the steviol glucosides contained in the sweetener (X) is 0.4 or more and a ratio of GRA to RA is 1.0 or more, the sweetener has mild sweetness like sugar and also has a sharp head-taste of sweetness, a sharp after-taste of sweetness, as well as reduction of the bitterness and astringency that are peculiar to the Stevia sweetener.

β-1,4-galactosyl rebaudioside A can inhibit the sweetness from being reduced by about 30% as compared with rebaudioside A because the addition polymerization of the galactosyl group to the galactosyl group added to rebaudioside A does not occur.

The process for preparing the sweetener of the present invention is an easy process, comprising allowing a β-1,4-galactosyl transferase to react on an aqueous solution containing a Stevia extract containing 40% by weight or more of rebaudioside A and a β-1,4-galactosyl sugar compound in a 5- to 20-fold amount based on the solid content of the Stevia extract, thus making it possible to preferably prepare a sweetener which has mild sweetness like sugar and also has a sharp head-taste of sweetness, a sharp after-taste of sweetness, as well as reduction of the bitterness and astringency of after-taste peculiar to the Stevia sweetener.

DETAILED DESCRIPTION OF THE INVENTION

The sweetener of the present invention is satisfactory as long as it contains steviol glucosides and as long as the above expressions (1) and (2) are satisfied. However, it is preferable that the following expressions (3) and (4) be satisfied, because the resulting sweetener has mild sweetness.:

$$0.95 \geq [(GRA+RA)/(X)] \geq 0.5 \quad (3)$$

$$10.0 \geq [(GRA)/(RA)] \geq 1.1 \quad (4)$$

It is more preferable that the steviol glucosides further comprise

β-1,4-galactosyl stevioside having one to two β-1,4-bonded galactosyl groups in a molecule and stevioside, and that the following expression (5) be satisfied, because the resulting sweetener has even milder sweetness:

$$[(GRA+RA)/(GST+ST)] \geq 1.0 \quad (5)$$

wherein GST represents the weight percentage of the β-1,4-galactosyl stevioside having one to two β-1,4-bonded galactosyl groups in a molecule, and ST represents the weight percentage of the stevioside.

It is even more preferable that the aforementioned expression (3) and the following expressions (6) and (7) be satisfied, because the resulting sweetener has particularly mild sweetness:

$$5.0 \geq [(GRA)/(RA)] \geq 1.1 \quad (6)$$

$$[(GRA+RA)/(GST+ST)] \geq 1.5 \quad (7)$$

wherein GRA, RA, GST and ST are as defined above.

The process for preparing the sweetener of the present invention is not specifically limited, but is preferably a process for preparing the sweetener, which comprises allowing a β-1,4-galactosyl transferase to react on an aqueous solution containing a Stevia extract containing 40% by weight or more of rebaudioside A and a β-1,4-galactosyl sugar compound in a 5- to 20-fold amount based on the solid content of the Stevia extract, because it makes it possible to easily prepare a sweetener which satisfies the expressions (1) and (2) and which has mild sweetness like sugar and also has a sharp head-taste of sweetness, a sharp after-taste of sweetness, as well as reduction of the bitterness and astringency of after-taste peculiar to the Stevia sweetener.

The process using a Stevia extract containing less than 40% by weight of rebaudioside A as a Stevia extract is not preferred for the following reason. That is, since the sum of the weight percentage of β-1,4-galactosyl rebaudioside A having one to three β-1,4-bonded galactosyl groups in a molecule (hereinafter referred to as β-1,4-galactosyl rebaudioside A) and the weight percentage of rebaudioside A, (GRA+RA), decreases and, at the same time, the sum of the weight percentage of β-1,4-galactosyl stevioside having one to two β-1,4-bonded galactosyl groups in a molecule (hereinafter referred to as β-1,4-galactosyl stevioside) and the weight percentage of stevioside, (GST+ST), increases, it becomes difficult to prepare a sweetener which satisfies the expressions (1) and (2) and the resulting sweetener has inferior mild sweetness, delayed head-taste of sweetness, prolonged after-taste of sweetness as well as bitterness and astringency of after-taste peculiar to the Stevia sweetener.

The Stevia extract usually contains a sweetness component composed of steviol glucosides such as stevioside, rebaudioside A, rebaudioside C, or dulcoside A, and the stevioside has the following structure.

Also, the rebaudioside A has the following structure wherein glucose is further bonded to a glucose residue represented by 13-G1 in the structure of the stevioside.

Typical examples of the β-1,4-galactosyl sugar compound used in the process of the present invention include disaccharides of galactose and glucose, which are bonded with each other, such as lactose and α-D-galactose. These compounds have the following structure.

Examples of β-1,4-galactosyl rebaudioside A contained in the sweetener of the present invention include those wherein one galactosyl group is bonded to each of one to three glucose residues among four glucose residues of a glucose residue bonded at the 13-position of a steviol skeleton of rebaudioside A (referred to as 13-G1), two glucose residues bonded at the 13-position of the steviol skeleton glucose residue (referred to 13-G2 and 13-G3) and glucose residue bonded at the 19-position of a steviol skeleton (referred to as 19-G1) by means of the β-1,4 bonding.

It is estimated that three glucose residues 13-G2, 13-G3 and 19-G1 are liable to cause β-1,4-transferring of the galactosyl group by means of an action of β-1,4-galactosyl transferase among glucose residues of rebaudioside A. Actually, as illustrated in Examples described hereinafter, analysis by high-performance liquid chromatography showed a peak of β-1,4-galactosyl rebaudioside A wherein three or fewer galactosyl groups are bonded to rebaudioside A.

It is estimated that each of these galactosyl groups is bonded to three glucose residues at the β-1,4-position due to steric hindrance and, with the progress of the enzyme reaction, rebaudioside A having one β-1,4-galactosyl group bonded thereto (β-1,4-monogalactosyl rebaudioside A), rebaudioside A having two β-1,4-galactosyl groups bonded thereto (β-1,4-digalactosyl rebaudioside A) and rebaudioside A having three β-1,4-galactosyl groups bonded thereto (β-1,4-trigalactosyl rebaudioside A) are formed in this sequence. The β-1,4-galactosyl rebaudioside A in the sweetener provided by the present invention is composed of a mixture of a plurality of β-1,4-galactosyl rebaudioside A.

The sweetener provided by the present invention may contain, in addition to aforementioned main β-1,4-galactosyl rebaudioside A, β-1,4-galactosyl rebaudioside A resulting from β-1,4-bonding of a galactosyl group to 13-G1 or a small amount of galactosyl rebaudioside A as long as it is a galactosyl rebaudioside A obtained by transferring a galactosyl group to rebaudioside A from a β-1,4-galactosyl sugar compound by means of an operation of β-1,4-galactosyl transferase.

It is indispensable that the Stevia extract used in the process for preparing the sweetener of the present invention is a Stevia extract containing 40% by weight or more of rebaudioside A. The Stevia extract is preferably a Stevia extract containing 50% by weight or more of rebaudioside A, and more preferably a Stevia extract containing 70 to 95% by weight of rebaudioside A, because it is easier to prepare a sweetener which has mild sweetness, and also has a sharp head-taste of sweetness, a sharp after-taste of sweetness, as well as reduction of the bitterness and astringency that are peculiar to the Stevia sweetener. Furthermore, the Stevia extract used in the process of the present invention is particularly preferably a Stevia extract containing rebaudioside A in a 1.5-fold amount or more based on the weight of stevioside for the following reason. That is, the sweetness intensity of β-1,4-galactosyl rebaudioside A resulting from transferring of a galactosyl group to rebaudioside A by means of β-1,4-galactosyl transferase is reduced as compared with original rebaudioside A, while reduction in sweetness intensity is considerably less than the sweetness intensity of β-1,4-galactosyl stevioside resulting from bonding of a galactosyl group to stevioside. The content of rebaudioside A in the Stevia extract of less than 40% by weight is not preferred because the sweetness intensity and sweetness of the resulting sweetener are reduced, resulting in inferior sweetness.

Examples of the process for preparing the Stevia extract which satisfies the above conditions include, but are not limited to, the following two processes.

A first process is a process of extracting plants or dried leaves of Stevia rebaudiana BERTONI containing 40% by weight or more of rebaudioside A and rebaudioside A in a 1.5-fold amount or more based on the weight of stevioside with water or a hydrous organic solvent such as hydrous methanol or hydrous ethanol and removing a non-sweetness component from the resulting extract.

A second process is a process of extracting plants or dried leaves of Stevia rebaudiana BERTONI containing rebaudioside A in an arbitrary amount based on stevioside with water or a hydrous organic solvent such as hydrous methanol or hydrous ethanol, removing a non-sweetness component from the resulting extract, and isolating and purifying the residue using a conventional process such as recrystallization or column purification to obtain a Stevia extract containing 40% by weight or more of rebaudioside A and rebaudioside A in a 1.5-fold amount or more based on the weight of stevioside. These first and second processes can be used in combination.

In these first and second processes, examples of the process for removing the non-sweetness component include a conventional purification process such as process of removing ionic impurities from the Stevia extract using a cation-exchange resin and an anion-exchange resin, adsorbing a sweetness component on an adsorbent resin, eluting with a hydrophilic organic solvent such as methanol or ethanol and concentrating the eluent under reduced pressure to remove the organic solvent, and process of adsorbing a sweetness component on an adsorbent resin, eluting with a hydrophilic organic solvent such as methanol or ethanol, concentrating the eluent under reduced pressure to remove the organic solvent and removing ionic impurities using a cation-exchange resin.

Examples of the cation-exchange resin include AMBERLITE IR-120B (a product of ORGANO CORPORATION) and examples of the anion-exchange resin include AMBERLITE IRA-93 manufactured by ORGANO CORPORATION. Examples of the adsorbent include AMBERLITE XAD-2 manufactured by ORGANO CORPORATION.

In the second process, the industrial process of removing the non-sweetness component from the extract and isolating and purifying the residue to obtain a Stevia extract containing 40% by weight or more of rebaudioside A and rebaudioside A in a 1.5-fold amount or more based on the weight of stevioside is, for example, a recrystallization process of dissolving the Stevia extract, the non-sweetness component of which was removed, in a hydrophilic organic solvent such as methanol or ethanol up to a saturated concentration, selectively depositing rebaudioside A by means of concentration or cooling and isolating a crystal by means of filtration.

The β-1,4-galactosyl sugar compound used in the present invention is not specifically limited as long as it can serve as a substrate of the β-1,4-galactosyl and is capable of transferring a β-1,4-galactosyl group to rebaudioside A from the β-1,4-galactosyl sugar compound, and is most preferably lactose in view of availability.

The β-1,4-galactosyl transferase used in the present invention may be any enzyme having a β-1,4-galactosyl transferring activity and examples thereof include enzymes derived from microorganisms capable of producing an enzyme having a β-1,4-galactosyl transferring activity. Among these enzymes, an enzyme extracted from cultured cells obtained by culturing microorganisms is preferred because of easy handling. In place of such a β-1,4-galactosyl transferase, a suspension of cells obtained by culturing microorganisms capable of producing an enzyme having a β-1,4-galactosyl transferring activity may be used as they are, or immobilized cells obtained by immobilizing microorganisms may be used. Examples of the enzyme extracted from the cultured cells include lactase capable of hydrolyzing lactose, for example, BIOLACTA manufactured by Daiwa Fine Chemicals Co., Ltd.

The microorganisms capable of producing the enzyme having a β-1,4-galactosyl transferring activity are preferably microorganisms of the genus *Rhodotorula*, and particularly preferably *Rhodotorula minuta* IFO-1540, *Rhodotorula marina* IFO-1421 and *Rhodotorula lactosa* IFO-1424.

Also, microorganisms of the genus *Bacillus* can be preferably used and *Bacillus circulans* are used particularly preferably. The microorganisms capable of producing the enzyme having a β-1,4-galactosyl transferring activity may be microorganisms capable of producing the enzyme having a β-1,4-galactosyl transferring activity, which belong to the other genera or species, as long as they do not have properties unsuitable for use in foods and drinks, for example, pathogenicity.

These microorganisms are obtained by growing them in a culture medium suitable for the growth of conventional microorganisms, for example, a culture medium which contains carbon sources such as glucose, sucrose, lactose and glycerin, nitrogen sources such as ammonium sulfate, ammonium nitrate, urea and ammonium acetate, nitrogen-containing natural products such as yeast extract and corn steep liquor, and inorganic salts such as potassium phosphate, calcium phosphate, sodium chloride and magnesium sulfate, and also contains vitamins and trace metal salts.

Transferring of the galactosyl group to rebaudioside A from the β-1,4-galactosyl sugar compound and the β-1,4-addition reaction is proceeded by adding a β-1,4-galactosyl transferase in an aqueous solution which contains an Stevia extract containing rebaudioside A and a β-1,4-galactosyl sugar compound.

The aqueous solution, which contains a Stevia extract containing 40% by weight or more of rebaudioside A and a β-1,4-galactosyl sugar compound, used in the process of the present invention may contain the Stevia extract and the β-1,4-galactosyl sugar compound in a 5- to 20-fold amount, and preferably 6- to 16-fold amount, based on the weight of the solid content of the Stevia extract.

The solid content of the Stevia extract in the above aqueous solution is usually from 0.1 to 15% by weight, but is preferably from 1 to 5% by weight, in view of economical efficiency. The concentration of the β-1,4-galactosyl sugar compound in the aqueous is usually from 0.1 to 30% by weight, and preferably from 5 to 20% by weight, in view of economical efficiency and productivity.

The amount of the β-1,4-galactosyl transferase is not specifically limited as long as it is present in an amount sufficient to produce β-1,4-galactosyl rebaudioside A due to an action of the β-1,4-galactosyl transferase, but is preferably from 1 to 1000 units (U), and more preferably from 5 to 500 U per g of the solid content of the Stevia extract because the reaction efficiency is improved, and in view of economy. As used herein, the term "1 unit (U)" refers to an amount of a β-1,4-galactosyl transferase required to produce 1 μmol of o-nitrophenol in one minute by hydrolyzing a β-galactoside bond in o-nitrophenyl-β-D-galactopyranoside (hereinafter referred to as ONPG) when 1 μmol of ONPG is allowed to react with the galactosyl transferase.

The unit of the β-1,4-galactosyl transferase was measured in the following procedure. That is, 0.1 ml of an enzyme solution was added in a solution prepared by mixing 2.5 ml of an aqueous ONPG solution having a concentration of 5 mmol/l (liter) with 4.9 ml of a potassium-sodium phosphate buffer (pH7.25) having a concentration of 100 mmol/l, thereby allowing to react at 40° C. for 10 minutes, and then 2.5 ml of an aqueous sodium carbonate ($Na_2CO_3$) solution having a concentration of 1.0 mol/l was added, thereby terminating the reaction. If necessary, the reaction solution was diluted with a proper amount of pure water and an absorption at a wavelength of 420 nm of the resulting o-nitrophenol was measured and the amount of the nitrophenol was determined from the resulting absorbance, and then the amount was divided by 10 to obtain the amount of the nitrophenol produced in one minute.

The pH of the system when the β-1,4-galactosyl transferase is allowed to react on the aqueous solution is not specifically limited as long as β-1,4-galactosyl rebaudioside A can be produced by allowing the β-1,4-galactosyl transferase to react on the aqueous solution under the conditions of the pH, but is usually from 3 to 10, and preferably from 4 to 7, because of excellent enzyme reaction efficiency. Also, the reaction temperature is not specifically limited as long as β-1,4-galactosyl rebaudioside A can be produced by allowing the β-1,4-galactosyl transferase to react on the aqueous solution under the conditions of the reaction temperature, but is usually from 20 to 70° C., and preferably from 40 to 60° C., because of excellent enzyme reaction efficiency. The time, during which the β-1,4-galactosyl transferase is allowed to react on the aqueous solution, is usually from 3 to 48 hours, but is preferably from 9 to 24 hours, in view of economical efficiency and productivity.

β-1,4-transferring of the galactosyl group to rebaudioside A from the β-1,4-galactosyl sugar compound by means of an operation of the β-1,4-galactosyl transferase has the following advantage. That is, cleavage of the galactosyl group from the β-1,4-galactosyl sugar compound and β-1,4-transferring occur simultaneously and it is impossible to conduct additional β-1,4-transferring of the galactosyl group to a hydroxyl group at the 4-position of the galactosyl group, which was once transferred to a glucose residue of rebaudioside A. That is, unlike α-1,4-glycosidase or glucosyl transferase, a sweetness intensity of the resulting sweetener is not reduced because a long glucose chain is not formed by continuous α-1,4-addition polymerization of the glucosyl group to the hydroxyl group at the 4-position of the previously transferred glucose residue.

The aqueous solution can be used, as it is, as the sweetener after the β-1,4-galactosyl transferase was allowed to react on the aqueous solution containing the Stevia extract and the β-1,4-galactosyl sugar compound, but is usually used as the sweetener in the form of a syrup or a powder after the β-1,4-galactosyl transferase was inactivated (after heat sterilization of microorganisms was also conducted when using microorganisms capable of producing an enzyme having a β-1,4-galactosyl transferring activity in place of the β-1,4-galactosyl transferase) and impurities were removed by using a styrenedivinylbenzene-based synthetic adsorbent resin such as Diaion HP-21 (a product manufactured by Mitsubishi Chemical Co., Ltd.), AMBERLITE XAD-2 (a product manufactured by ORGANO CORPORATION), a cation-exchange resin or an anion-exchange resin, and then the aqueous solution was concentrated or dried. In that case, various conventionally known processes such as concentration under reduced pressure, film concentration, freeze-drying and spray-drying can be employed as means for concentration, drying and powderization.

The sweetener of the present invention or the sweetener obtained by the process of the present invention can be used alone, or can be used in combination with a low calorie sweetener having a sweetness intensity lower than that of sugar, for example, sorbitol, maltitol, reduced starch syrup, xylitol, trehalose or erythritol and thus making it possible to impart stronger sweetness without impairing these sweeteners and to yield a low calorie sweetener preparation with good quality.

The dry article of the sweetener of the present invention or the sweetener obtained by the process of the present invention is a pale yellow or white powder having no odor. Therefore, the sweetener can be used in the form of a dry article alone, or can be preferably used in combination with a saccharide sweetener as a diluent, for example, sugar, fructose, glucose, lactose, isomerized sugar, starch syrup, dextrin or starch. Furthermore, it can be preferably used in combination with a non-saccharide sweetener having a high sweetness intensity, for example, licorice extract, saccharin, aspartame, acesulfame potassium or sucralose.

In the present invention, X [the weight percentage of the steviol glucosides contained in the sweetener] used in the expressions (1) and (3) is a weight percentage (%) measured in accordance with the determination process [(1) process for determination of steviol, (2) process for determination of sugar in glucoside and (4) calculation of content] described in Independent Standard for Food Additives excluding Chemically Synthesized Products issued by Japan Food Additives Association (2nd edition, issued on Oct. 1, 1993), pp. 119-121 "Enzyme-Treated Stevia".

The determination process described in "Enzyme-Treated Stevia" is not a determination process for a galactose addition reaction product such as β-1,4-galactosyl rebaudioside A, but a determination process for glucose addition reaction product such as α-glucosyl stevioside. In the present invention, X was measured in accordance with this process.

Any of RA [the weight percentage of rebaudioside A contained in the sweetener] used in the expressions (1) to (7) and ST [the weight percentage of stevioside contained in the sweetener] used in the expressions (5) and (7) is a weight percentage (%) measured in accordance with the determination process described in Independent Standard for Food Additives excluding Chemically Synthesized Products issued by Japan Food Additives Association (2nd edition, issued on Oct. 1, 1993), pp. 122-123 "Stevia Extract" and the determination process [(3) process for determination of the unreacted steviol glucosides] described in "Enzyme-Treated Stevia".

Furthermore, GRA [the weight percentage of β-1,4-galactosyl rebaudioside A, contained in the sweetener, having one to three β-1,4-bonded galactosyl groups in a molecule] and GST [the weight percentage of β-1,4-galactosyl stevioside, contained in the sweetener, having one to two β-1,4-bonded galactosyl groups in a molecule] used in the expressions (1) to (7) were measured simultaneously when RA and ST were measured, although the determination process is not described in Independent Standard for Food Additives excluding Chemically Synthesized Products issued by Japan Food Additives Association.

In the present invention, each weight percentage of X, RA, ST, GRA and GST is measured in accordance with the determination process described in the "Enzyme-Treated Stevia" and "Stevia Extract", with the exception of the following points. The difference and the reason thereof are shown below.

Difference in "(1) Process for Determination of Steviol" of "Enzyme-Treated Stevia"

(1)-(i): Drying Step of Sample

Although there is no description about drying of the sample in "(1) process for determination of steviol", the sample was dried at 105° C. for 2 hours in the same manner as in a reference standard in order to conduct an accurate analysis.

(1)-(ii): Calculation Equation of the Weight Percentage of Steviol

Although the content of steviol is not calculated taking account of the purity of stevioside of a reference standard in "(1) process for determination of steviol", in order to exactly calculate the content of steviol, the weight percentage of steviol was determined, taking account of the purity of stevioside of the reference standard, using the following equation:

$$A = \frac{As \times S \times \text{purity of stevioside of reference standard} \times 100 \times K}{Ast \times X}$$

where
A denotes the weight percentage (%) of steviol as a sample,
As denotes an area ratio of an isosteviol methyl ester as a test solution to squalene,
Ast denotes an area ratio of an isosteviol methyl ester as a standard solution to squalene,
S deonotes a sampling amount (mg) of stevioside,
X denotes a sampling amount (mg) of a sample, and
K denotes a reduction coefficient to steviol, 318.46/804.88=0.3957.

Change in "(2) Process for Determination of Sugar in Glucoside" of "Enzyme-Treated Stevia"

(2)-(i): Preparation of Sample Solution

In "(2) process for determination of sugar in glucoside", the process for preparation of a sample is as follows. After taking about 1.0 g of a sample and exactly measuring it, the sample is dissolved in 50 ml of water. The solution is poured into in a resin column having a diameter of about 2.5 cm made of 50 ml of an adsorbent resin for enzyme-treated Stevia, allowed to flow out at a rate of 3 ml of less per minute and then washed with 250 ml of water. Then, the component adsorbed in the resin is eluted by passing 250 ml of 50 v/v % ethanol (mixed solution wherein the content of ethanol in 100 ml of an ethanol-water mixed solution is 50 ml) or 90 v/v % methanol (mixed solution wherein the content of methanol in 100 ml of an methanol-water mixed solution is 90 ml) through the column at a rate of 3 ml of less per minute. After conducting an operation of concentrating this solution to dryness in a rotary evaporator to obtain a residue, water is added thereto to make exactly 500 ml in total. The resulting solution is used as a sample solution.

However, the above process for preparing the sample is a process for preparing a sample free from saccharides with respect to the enzyme-treated Stevia containing saccharides added therein. In the present invention, saccharides are not added to the enzyme-treated Stevia. Therefore, after taking about 1.0 g of a sample and exactly measuring it without conducting the operation described in the process for preparing the sample, water is added thereto to make exactly 500 ml in total. The resulting solution is used as a sample solution. The sample solution was dried at 105° C. for 2 hours in order to conduct accurate measurement.

Change in "Stevia Extract"

(i) Drying Step of Sample

Although there is no description about drying of the sample in the determination process described in "Stevia Extract", the sample was dried at 105° C. for 2 hours in the same manner as in a reference standard in order to conduct an accurate analysis.

(ii) Mobile Phase in Liquid Chromatography

In the determination process described in "Stevia Extract", an acetonitrile-water mixed solution in a volume ratio of 80:20 is used as a mobile phase in liquid chromatography. This solvent composition is defined for the purpose of the determination of stevioside and rebaudioside A. The retention time of a peak of stevioside is about 10 minutes, while the retention time of a peak of rebaudioside A is about 20 minutes, and these components are eluted within 30 minutes.

However, when a β-1,4-galactosyl rebaudioside A composition is analyzed using this mobile phase composition, the retention time of a peak of β-1,4-trigalactosyl rebaudioside A becomes about 170 minutes and elution of the entire sugar-added component requires 3 or more hours. Therefore, this process is not suitable as an actual analysis process.

Therefore, in the present invention, an acetonitrile-water mixed solution in a volume ratio of 78:22 was used as the mobile phase for promotion of efficiency of liquid chromatography. When using this mobile phase, the retention time of a peak of stevioside is about 5 minutes, while the retention time of a peak of rebaudioside A is about 8 minutes and the longest retention time of a peak of β-1,4-trigalactosyl rebaudioside A becomes about 45 minutes. Thus, the elution of the entire sugar-added component is completed within one hour.

(iii) Calculation of Weight Percentage

Although the content is not calculated taking account of the purity of a reference standard (stevioside, rebaudioside) used in the determination process described in "Stevia Extract", in order to conduct accurate determination, the sampling amount of the reference standard was multiplied by the purity, taking account of the purity of the reference standard. This is also the same about β-1,4-galactosyl stevioside and β-1,4-galactosyl rebaudioside A described hereinafter.

(iv) Calculation of Weight Percentage of β1,4-galactosyl Stevioside and β-1,4-galactosyl Rebaudioside A The weight percentages of β-1,4-galactosyl stevioside and β-1,4-galactosyl rebaudioside A were measured by using the determination process described in "Stevia extract" in combination with the molecular weight reduction process. The weight percentages of β-1,4-galactosyl stevioside were calculated in the following manner. Using stevioside as a standard substance, the respective peak areas of β-1,4-monogalactosyl stevioside and β-1,4-digalactosyl stevioside as β-1,4-galactosyl stevioside were used in place of the peak area of stevioside of the test solution in the calculation equation for determination of the weight percentage of stevioside and, furthermore, the calculation was conducted by multiplying the calculation equation for determination of the weight percentage of stevioside by a molecular weight ratio between the respective components, that is, stevioside shown in Table 1 described below and β-1,4-galactosyl stevioside.

TABLE 1

| Component name | Molecular weight | Molecular weight reduction coefficient |
|---|---|---|
| Stevioside | 804.9 | 1.00 |
| β-1,4-monogalactosyl stevioside | 967.0 | 1.20 |
| β-1,4-digalactosyl stevioside | 1129.2 | 1.40 |

The weight percentages of β-1,4-galactosyl rebaudioside A was calculated in the following manner. Using rebaudioside A as a standard substance, the respective peak areas of β-1,4-monogalactosyl rebaudioside A, β-1,4-digalactosyl rebaudioside A and β-1,4-trigalactosyl rebaudioside A as β-1,4-galactosyl rebaudioside A were used in place of the peak area of rebaudioside A of the test solution in the calculation equation for determination of the weight percentage of rebaudioside A and, furthermore, the calculation was conducted by multiplying the calculation equation for determination of the weight percentage of rebaudioside A by a molecular weight ratio between the respective components, that is, stevioside shown in Table 2 described below and β-1,4-galactosyl rebaudioside A.

TABLE 2

| Component name | Molecular weight | Molecular weight reduction coefficient |
|---|---|---|
| Rebaudioside A | 967.0 | 1.00 |
| β-1,4-monogalactosyl rebaudioside A | 1129.2 | 1.17 |
| β-1,4-digalactosyl rebaudioside A | 1291.3 | 1.34 |
| β-1,4-trigalactosyl rebaudioside A | 1453.5 | 1.50 |

In the determination process described in "Stevia Extract", in order to measure the weight percentages of stevioside, rebaudioside A, β-1,4-monogalactosyl stevioside, β-1,4-digalactosyl stevioside, β-1,4-monogalactosyl rebaudioside A, β-1,4-digalactosyl rebaudioside A and β-1,4-trigalactosyl rebaudioside A, it is necessary to specify the peak of the respective components such as stevioside and β-1,4-monogalactosyl rebaudioside obtained in liquid chromatography. Therefore, in the present invention, liquid chromatography (HPLC) was conducted under the following conditions to obtain a peak retention time, and then each component was specified in order for every peak retention time similar to the measuring results of Example 1 shown in Table 3 described below.

Measuring Conditions
Column: $NH_2$ group bonded silica having a particle diameter of 5 μm (Unisil Q $NH_2$, manufactured by GL Sciences Inc.)
Column tube: inner diameter of 4.6 mm, length of 150 mm
Column tank temperature: 40° C.
Mobile phase: acetonitrile-water mixed solution in a mixing ratio of 78:22
Flow rate: 2.0 ml/min
Injection amount: 5 μl
Measuring wavelength: 210 nm

TABLE 3

| Peak retention time (min) | Component name |
|---|---|
| 4.662 | Stevioside |
| 8.070 | Rebaudioside A |
| 8.722 | β-1,4-monogalactosyl stevioside |
| 9.138 | β-1,4-monogalactosyl rebaudioside A |
| 13.093 | β-1,4-monogalactosyl stevioside |
| 14.412 | β-1,4-monogalactosyl rebaudioside A |
| 15.517 | β-1,4-monogalactosyl rebaudioside A |
| 23.298 | β-1,4-digalactosyl rebaudioside A |
| 25.428 | β-1,4-digalactosyl stevioside |
| 29.568 | β-1,4-digalactosyl rebaudioside A |
| 31.582 | β-1,4-digalactosyl rebaudioside A |
| 44.917 | β-1,4-trigalactosyl rebaudioside A |

Specific examples of these measurements are illustrated as Example 1 in the present specification.

EXAMPLES

The following Reference Examples, Examples and Comparative Examples further illustrate the present invention in detail. In the Examples, percentages are by weight unless otherwise specified. The weight percentages of stevioside and rebaudioside A in Stevia extract Al, Stevia extract Al and Stevia extract B are weight percentages (%) measured in accordance with the determination process described in Independent Standard for Food Additives excluding Chemically Synthesized Products of Japan Food Additives Association (2nd edition, issued on Oct. 1, 1993), pp. 122-123, "Stevia Extract".

Reference Example 1

Preparation of Strain Suspension for Culturing Microorganisms Capable of Producing β-1,4-galactosyl Transferase A culture medium (pH 5.2, 3 liters) composed of 0.4% of dipotassium hydrogenphosphate, 0.5% of ammonium sulfate, 0.06% of magnesium sulfate, 0.001% of zinc sulfate, 0.005% of ferrous sulfate, 0.1% of yeast extract, 1.0% of glucose and 0.5% of lactose was charged in a jar fermentor having a volume of 10 liters and then sterilized by autoclaving. After air-cooling, a strain of *Rhodotorula minuta* was inoculated on the culture medium and cultured at 30° C. with aeration and stirring for 24 hours to produce cells. The resulting culture broth was centrifuged and the cells were collected. The cells were washed twice with a phosphate buffer having a concentration of 0.05 mol/l and then suspended in 600 ml of the same buffer to prepare a suspension of cells. The total activity of β-1,4-galactosyl transferase in the resting cells was 3420 U.

Reference Example 2

Preparation of Crude Enzyme Solution of β-1,4-galactosyl Transferase

The same culture medium (3 liters) as in Reference Example 1 was charged in a jar fermentor having a volume of 10 liters and then sterilized by autoclaving. After air-cooling, a strain of *Bacillus circulans* was inoculated on the culture medium and cultured at 30° C. with aeration and stirring for 24 hours to produce cells. The resulting culture broth was centrifuged and the cells were collected. The cells were washed twice with a 0.05 mol/l phosphate buffer and then suspended in 100 ml of the same buffer to prepare a suspension of cells. After crushing the cells by ultrasonic crushing, the suspension was centrifuged to remove the crushed cells, and a precipitate was salted out from the supernatant by adding 70% saturation ammonium sulfate. The precipitate was collected by centrifugation. The recovered precipitate was suspended in 100 ml of a phosphate buffer having a concentration of 0.05 mol/l to prepare a crude enzyme solution. The total activity of β-1,4-galactosyl transferase of the crude enzyme solution was 2988 U.

Example 1

10.0 g of a Stevia extract Al (the weight percentage of stevioside: 26.8%, the weight percentage of rebaudioside A: 58.5%) and 100 g of lactose as a galactosyl sugar compound were dissolved in 500 ml of water with heating and the solution was air-cooled to room temperature, and then the pH was adjusted to 6.0 using an aqueous sodium hydroxide solution having a concentration of 1 mol/l. To the solution, 100 ml of a suspension of cells having a β-1,4-galactosyl transferase activity obtained in Reference Example 1 was added, followed by the reaction at 50° C. for 24 hours. After the completion of the reaction, this reaction solution was maintained at 95° C. for 30 minutes to inactivate the enzyme.

After this solution was filtered to remove a suspended solid, the filtrate was passed through a column packed with 500 ml of styrenedivinylbenzene synthetic adsorbent resin (Diaion HP-21) to cause adsorption of a sweetness component. After the stationary phase was sufficiently washed with water to remove lactose used in this reaction, 1000 ml of hydrous methanol having a concentration of 80% was passed through the column to cause elution of a sweetness component containing β-1,4-galactosyl rebaudioside A and the eluate was concentrated under reduced pressure and dried to obtain 11.2 g of a pale yellow powdered sweetener (hereinafter referred to as a sweetener 1).

Then, the weight percentage of rebaudioside A (RA), the weight percentage of β-1,4-galactosyl rebaudioside A (GRA), the weight percentage of stevioside (ST) and the weight percentage of β-1,4-galactosyl stevioside (GST) in a sweetener 1 were measured in accordance with the aforementioned Independent Standard for Food Additives excluding Chemically Synthesized Products of Japan Food Additives Association (2nd edition, issued on Oct. 1, 1993), pp. 122-123, "Stevia Extract". A specific process will be illustrated below.

The sweetener 1 was dried at 105° C. for 2 hours and 1.52205 g of the sweetener was dissolved in pure water to make exactly 100 ml to prepare a test solution. Using stevioside having a purity of 99.4% manufactured by Wako Pure Chemical Industries, Ltd., as a stevioside reference standard, the stevioside was dried at 105° C. for 2 hours and 52.26 mg of the stevioside was dissolved in a mobile phase to make exactly 100 ml to prepare a standard stevioside solution.

In the same manner, using rebaudioside A having a purity of 99.6% manufactured by Wako Pure Chemical Industries, Ltd., as a rebaudioside A reference standard, the rebaudioside A was dried at 105° C. for 2 hours and 50.78 mg of the rebaudioside A was dissolved in a mobile phase to make exactly 100 ml to prepare a standard rebaudioside A solution.

Then, the test solution and the standard solution were analyzed by liquid chromatography under the following operation conditions.

Detector: ultraviolet absorption detector (measuring wavelength: 210 nm)

Column: $NH_2$ group bonded silica having a particle diameter of 5 μm (Unisil Q $NH_2$, manufactured by GL Sciences Inc.)

Column tube: inner diameter of 4.6 mm, length of 150 mm
Column tank temperature: 40° C.

Mobile phase: acetonitrile-water mixed solution in a mixing ratio of 78:22

Flow rate: 2.0 ml/min

Injection amount: 5 μl

Figure 1:
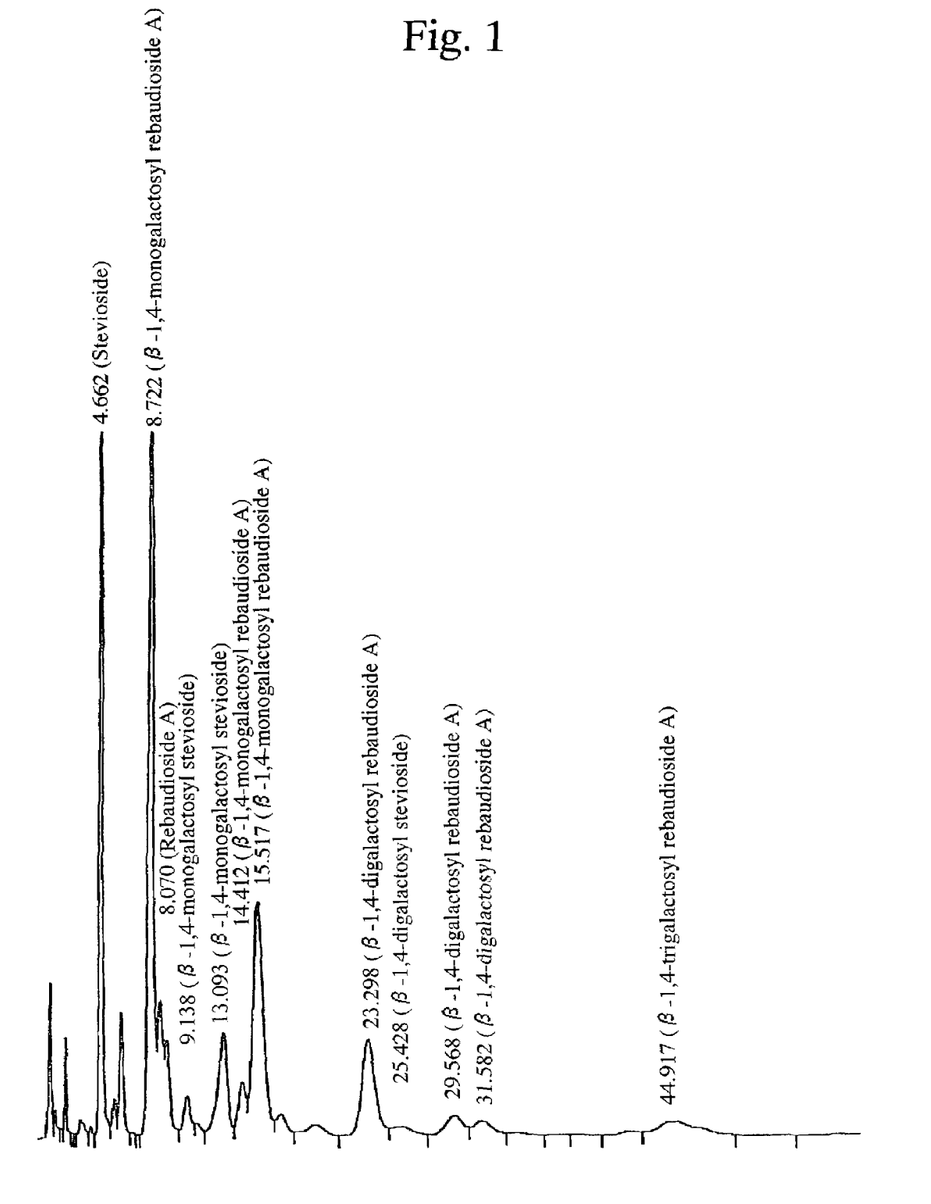
FIG. 1 is a graph showing a high-performance liquid chromatogram of a sweetener 1 of Example 1.

The high-performance liquid chromatogram of the test solution obtained as a result of analysis by liquid chromatography is shown in FIG. 1, while a relationship between the retention time of each peak in the liquid chromatogram and the component name is shown in Table 4. The peak area of each component in the test solution as well as the peak area of stevioside of the standard solution and that of rebaudioside A of the reference standard were measured. The results are shown in Table 5.

TABLE 4

| Peak retention time (min) | Component name |
| --- | --- |
| 4.662 | Stevioside |
| 8.070 | Rebaudioside A |
| 8.722 | β-1,4-monogalactosyl stevioside |
| 9.138 | β-1,4-monogalactosyl rebaudioside A |
| 13.093 | β-1,4-monogalactosyl stevioside |
| 14.412 | β-1,4-monogalactosyl rebaudioside A |
| 15.517 | β-1,4-monogalactosyl rebaudioside A |
| 23.298 | β-1,4-digalactosyl rebaudioside A |
| 25.428 | β-1,4-digalactosyl stevioside |
| 29.568 | β-1,4-digalactosyl rebaudioside A |
| 31.582 | β-1,4-digalactosyl rebaudioside A |
| 44.917 | β-1,4-trigalactosyl rebaudioside A |

TABLE 5

| | Standard solution | | Test solution |
| --- | --- | --- | --- |
| | Stevioside (purity: 99.4%) | Rebaudioside A (purity: 99.6%) | Enzyme-treated Stevia A1 |
| Concentration (g/100 ml) | 0.05226 | 0.05078 | 1.52205 |
| Area Stevioside | 361605 | — | 1429012 |
| Rebaudioside A | — | 324814 | 1923081 |
| β-1,4-monogalactosyl stevioside | — | — | 670704 |
| β-1,4-digalactosyl stevioside | — | — | 76874 |
| β-1,4-monogalactosyl rebaudioside A | — | — | 1346498 |
| β-1,4-digalactosyl rebaudioside A | — | — | 802268 |
| β-1,4-trigalactosyl rebaudioside A | — | — | 162466 |

Then, using the area of each component shown in Table 5 and the following equation, the weight percentages of each component (ST, ST-G1, ST-G2, RA, RA-G1, RA-G2, RA-G3) in the sweetener 1 were calculated. Specific calculation examples are illustrated below. ST-G1 denotes the weight percentage of β-1,4-monogalactosyl stevioside, ST-G2 denotes the weight percentage of β-1,4-digalactosyl stevioside, RA-G1 denotes the weight percentage of β-1,4-monogalactosyl rebaudioside A, RA-G2 denotes the weight percentage of β-1,4-digalactosyl rebaudioside A and RA-G3 denotes the weight percentage of β-1,4-trigalactosyl rebaudioside A, respectively.

*ST*=(sampling amount (g) of stevioside reference standard×purity of reference standard×peak area of stevioside of test solution×100)/(sampling amount (g) of sample×peak area of stevioside of standard solution)=(0.05226×0.99×1429012×100)/(1.52205×361605)=13.5 (%)

*ST-G*1=(sampling amount (g) of stevioside reference standard×purity of reference standard×peak area of β-1,4-monogalactosyl stevioside of test solution×molecular weight reduction coefficient×100)/(sampling amount (g) of sample×peak area of stevioside of standard solution)=(0.05226×0.994×670704×1.20×100)/(1.52205×361605)=7.6(%)

*ST-G*2=(sampling amount (g) of stevioside reference standard×purity of reference standard×peak area of β-1,4-digalactosyl stevioside of test solution×molecular weight reduction coefficient×100)/(sampling amount (g) of sample×peak area of stevioside of standard solution)=(0.05226×0.994×76874×1.40×100)/(1.52205×361605)=1.0 (%)

RA=(sampling amount (g) of rebaudioside A reference standard×purity of reference standard× peak area of rebaudioside A of test solution× 100)/(sampling amount (g) of sample×peak area of rebaudioside A of standard solution)= (0.05078×0.996×1923081×100)/(1.52205× 324814)=19.7 (%)

RA-G1=(sampling amount (g) of rebaudioside A reference standard×purity of reference standard× peak area of β-1,4-monogalactosyl rebaudioside A of test solution×molecular weight reduction coefficient×100)/(sampling amount (g) of sample×peak area of rebaudioside A of standard solution)=(0.05078×0.996×1346498×1.17×100)/ (1.52205×324814)=16.1 (%)

RA-i G2=(sampling amount (g) of rebaudioside A reference standard×purity of reference standard×peak area of β-1,4-digalactosyl rebaudioside A of test solution×molecular weight reduction coefficient×100)/(sampling amount (g) of sample×peak area of rebaudioside A of standard solution)=(0.05078×0.996×802268×1.34×100)/ (1.52205×324814)=11.0 (%)

RA-G3=(sampling amount (g) of rebaudioside A reference standard×purity of reference standard× peak area of β-1,4-trigalactosyl rebaudioside A of test solution×molecular weight reduction coefficient×100)/(sampling amount (g) of sample×peak area of rebaudioside A of standard solution)=(0.05078×0.996×162466×1.50×100)/ (1.52205×324814)=2.5(%)

Then, the weight percentage X of steviol glucosides in the sweetener 1 was measured in accordance with the aforementioned Independent Standard for Food Additives excluding Chemically Synthesized Products of Japan Food Additives Association (2nd edition, issued on Oct. 1, 1993), pp. 119-121, "Enzyme-Treated Stevia".

(1) Determination of Weight Percentage of Steviol in Sweetener 1

The sweetener 1 was dried at 105° C. for 2 hours and, after measuring out 110.1 mg of the sweetener into a flask, 10 ml of 20 v/v % sulfuric acid (mixed solution wherein the content of sulfuric acid in 100 mL of a mixed solution of sulfuric acid and water is 20 g) was added. After cooling in running water heated over a water bath equipped with a reflux condenser for 2 hours, the contents were transferred to a separatory funnel, while a flask was washed with 10 ml of water and added to the separatory funnel. After the flask was further washed three times with 30 ml of ether each time, the washings were combined in the separatory funnel, shaken well and then allowed to stand. The aqueous layer was removed and the ether layer was washed twice with 20 ml of water, and then the aqueous layer was removed. The ether layer was transferred to another flask and the separatory funnel was washed twice with 10 ml of ether each time, while the washings were combined in a flask and 15 g of sodium sulfate (anhydride) was added. After shaking well and inclining, the ether layer was transferred to still another flask. The remaining sodium sulfate was washed twice with 10 ml of ether each time, and the washings were combined in a flask. After ether was distilled off, the residue was dissolved in 10 ml of ethyl acetate added thereto and 3 ml of 2 w/v % a diazomethane-ether solution (mixed solution wherein the content of diazomethane in 100 mL of a mixed solution of diazomethane and ether is 2 g) was added. After stoppering, the mixed solution was sometimes shaken and allowed to stand for 20 minutes.

A test solution was prepared by adding 0.5 ml of acetic acid to this solution, shaking well and adding exactly 2 ml of a squalene-n-butanol solution (prepared by dissolving 2.5 g of squalene in n-butanol and adding n-butanol to finally make 200 ml).

Separately, stevioside having a purity of 99.4% manufactured by Wako Pure Chemical Industries, Ltd., was dried at 105° C. for 2 hours and, after measuring out 42.1 ml of stevioside into a flask, the same operation as in case of the sweetener 1 was conducted to prepare a standard solution.

The test solution and the standard solution were analyzed by gas chromatography under the following operation conditions.

Detector: hydrogen flame ionization detector

Column packing: liquid phase is a 50% phenylmethyl silicone polymer in a proportion of 2% based on a carrier, while a carrier is diatomaceous earth (particle size: 177 to 250 μm) for gas chromatography [Silicone OV-17, 2% Chromosorb WAW-DMCS 60/80 (manufactured by GL Sciences Inc.)]

Column tube: glass tube in size of 3.2 mmΦ×2.1 m

Column tank temperature: 245° C.

Injection port temperature: 260° C.

Carrier gas: nitrogen gas

Flow rate: 50 ml/min

Injection amount: 2 μl

The peak areas of squalane and isosteviol methyl ester of the test solution and the peak areas of squalane and isosteviol methyl ester of the standard solution were measured. The results are shown in Table 6.

TABLE 6

|  | Standard solution (purity 99.4%) | Test solution |
|---|---|---|
| Sample amount | 42.10 mg | 110.1 mg |
| Peak area of squalane | 3926785 | 3887140 |
| Peak area of isosteviol methyl ester | 3082803 | 5168502 |

The weight percentage of steviol in the sweetener 1 was determined from the resulting peak area using the following equation:

$$A = \frac{As \times S \times \text{purity of stevioside of reference standard} \times 100 \times K}{Ast \times X} \quad \text{Equation (8)}$$

where

A denotes the weight percentage (%) of steviol as a sample,

As denotes an area ratio of an isosteviol methyl ester as a test solution to squalene, Ast denotes an area ratio of an isosteviol methyl ester as a standard solution to squalene, S denotes a sampling amount (mg) of stevioside, X denotes a sampling amount (mg) of a sample, and K denotes a reduction coefficient to steviol, 318.46/804.88=0.3957.

In this example, As=5168502/3887140=1.330 and Ast=3082803/3926785=0.785. Therefore, the weight percentage of steviol is calculated as follows: (1.330×42.1× 0.994×100×0.3957)/(0.785×110.1)=25.5%.

(2) Determination of Weight Percentage of Sugar in Steviol Glucosides

The sweetener 1 was dried at 105° C. for 2 hours and, after measuring out 1.0074 g of the sweetener, the sweetener was dissolved in 500 ml of water to prepare a sample solution.

After measuring out 200 mg of anthrone, anthrone was dissolved in 100 ml of sulfuric acid and the solution was gradually added in 20 ml of water with ice cooling, followed by mixing to prepare an anthrone reagent. The sample solution was diluted 50 times with water to give a test solution. After exactly measuring out 2 ml of the test solution into a glass-stoppered test tube, exactly 6 ml of the anthrone reagent was added while cooling the test solution in ice water, and then they were shaken well until the two solutions are completely mixed. Then, the mixed solution was heated in a boiling water bath for 16 minutes exactly. After ice cooling, the absorbance at a wavelength of 620 nm was measured using water as a control. As a result, it was 0.313.

Then, a glucose concentration (μg/ml) of the test solution was determined from a previously made glucose calibration curve. The glucose calibration curve was made from absorbances and concentrations obtained by operating solutions each having a glucose concentration of 10.96 μg/ml, 32.88 μg/ml and 54.80 μg/ml in the same manner as in case of the test solution. The glucose concentrations of the glucose calibration curve used in this example and the absorbances are shown in Table 7.

TABLE 7

| Glucose concentration (μg/ml) | Absorbance |
|---|---|
| 10.96 | 0.137 |
| 32.88 | 0.362 |
| 54.80 | 0.593 |

The calibration curve was represented by the equation: sugar concentration (μg/ml)=96.31×absorbance−2.15. The sugar concentration in the test solution was determined from the absorbance (0.313) at a wavelength of 620 nm of the test solution and the calibration curve.

Sugar concentration (μg/ml) of test solution=96.31×0.313−2.15=28.0

Furthermore, the weight percentage of sugar in steviol glucosides was determined by the following equation.

Weight percentage (%) of sugar in glucoside=[sugar concentration (μg/ml) determined from calibration curve×0.9×50×500×100]/[sampling amount (g) of sample×1000×1000]=(28.0×0.9×50×500×100)/(1.0074×1000×1000)=62.5%

(3) Calculation of Weight Percentage of Steviol Glucosides

The sum of the weight percentage of steviol and that of sugar in glucoside is taken as the weight percentage of steviol glucosides. The weight percentage of steviol glucosides in the sweetener 1 is calculated as follows: 25.5+62.5=88.0 (%).

The weight percentages (ST, RA, ST-G1, ST-G2, RA-G1, RA-G2, RA-G3 and X) of each component in the sweetener 1, the value of [(GRA+RA)/(X)] and the value of [(GRA)/(RA)] are shown in Table 8.

Example 2

10.0 g of a Stevia extract A1 (the weight percentage of stevioside: 26.8%, the weight percentage of rebaudioside A: 58.5%) and 100 g of lactose as a galactosyl sugar compound were dissolved in 500 ml of pure water with heating and the solution was air-cooled to room temperature, and then the pH was adjusted to 6.0 using an aqueous sodium hydroxide solution having a concentration of 1 mol/l. To the solution, the total amount of a solution of a crude enzyme having a β-1,4-galactosyl transferase activity obtained in Reference Example 2 was added, followed by the reaction at 50° C. for 24 hours. After the completion of the reaction, this reaction solution was maintained at 95° C. for 30 minutes to inactivate the enzyme.

After the reaction solution was filtered to remove a suspended solid, the filtrate was passed through a column packed with 500 ml of styrenedivinylbenzene synthetic adsorbent resin (Diaion HP-21) to cause adsorption of a sweetness component. After the stationary phase was sufficiently washed with water to remove lactose used in this reaction, 1000 ml of hydrous methanol having a concentration of 80% was passed through the column to cause elution of a sweetness component containing β-1,4-galactosyl rebaudioside A and the eluate was concentrated under reduced pressure and dried to obtain 11.1 g of a pale yellow powdered sweetener (hereinafter referred to as a sweetener 2).

In the same manner as in Example 1, determination of each component in the sweetener 2 was conducted. The results are shown in Table 8.

Example 3

10.0 g of a highly purified Stevia extract A2 containing 90% by weight of rebaudioside A (the weight percentage of stevioside: 1.1% by weight, the weight percentage of rebaudioside A: 91.3% by weight) and 100 g of lactose as a galactosyl sugar compound were dissolved in 500 ml of pure water with heating and the solution was air-cooled to room temperature, and then the pH was adjusted to 6.0 using an aqueous sodium hydroxide solution having a concentration of 1 mol/l. To the solution, 1.0 g (2477 U) of an enzyme preparation having a β-1,4-galactosyl transferase activity [BIOLACTA N5, manufactured by Daiwa Fine Chemicals Co., Ltd.] was added, followed by the reaction at 50° C. for 24 hours. After the completion of the reaction, this reaction solution was maintained at 95° C. for 30 minutes to inactivate the enzyme.

After the reaction solution was filtered to remove a suspended solid, the filtrate was passed through a column packed with 500 ml of styrenedivinylbenzene synthetic adsorbent resin (Diaion HP-21) to cause adsorption of a sweetness component. After the stationary phase was sufficiently washed with water to remove lactose used in this reaction, 1000 ml of hydrous methanol having a concentration of 80% was passed through the column to cause elution of a sweetness component containing β-1,4-galactosyl rebaudioside A and the eluate was concentrated under reduced pressure and dried to obtain 10.4 g of a pale yellow powdered sweetener (hereinafter referred to as a sweetener 3).

In the same manner as in Example 1, determination of each component in the sweetener 3 was conducted. The results are shown in Table 8.

Comparative Example 1

10.0 g of a Stevia extract B (the weight percentage of stevioside: 79.7%, the weight percentage of rebaudioside A: 11.1%) and 100 g of lactose as a galactosyl sugar compounds were dissolved in 500 ml of pure water with heating and the solution was air-cooled to room temperature, and then the pH was adjusted to 6.0 using an aqueous sodium hydroxide solution having a concentration of 1 mol/l. To the solution, 100 ml of a suspension of cells having a β-1,4-galactosyl transferase activity obtained in Reference Example 1 was added, followed by the reaction at 50° C. for 24 hours. After the completion of the reaction, this reaction solution was maintained at 95° C. for 30 minutes to inactivate the enzyme.

After the reaction solution was filtered to remove a suspended solid, the filtrate was passed through a column packed with 500 ml of styrenedivinylbenzene synthetic adsorbent resin (Diaion HP-21) to cause adsorption of a sweetness component. After the stationary phase was sufficiently washed with water to remove lactose used in this reaction, 1000 ml of hydrous methanol having a concentration of 80% was passed through the column to cause elution of a sweetness component containing β-1,4-galactosyl rebaudioside A and the eluate was concentrated under reduced pressure and dried to obtain 11.0 g of a pale yellow powdered sweetener (hereinafter referred to as a sweetener 1').

In the same manner as in Example 1, determination of each component in the sweetener 1' was conducted. The results are shown in Table 8.

TABLE 8

|  |  | Example 1 | Example 2 | Example 3 | Comparative Example 1 |
|---|---|---|---|---|---|
| Weight percentage | Sweetener ST | 1<br>13.5 | 2<br>14.1 | 3<br>0.8 | 1'<br>42.6 |

TABLE 8-continued

|  |  | Example 1 | Example 2 | Example 3 | Comparative Example 1 |
|---|---|---|---|---|---|
| (%) | RA | 19.7 | 23.6 | 32.4 | 4.2 |
|  | ST-G1 | 7.6 | 9.0 | 0.2 | 23.2 |
|  | ST-G2 | 1.0 | 1.1 | 0.0 | 3.4 |
|  | GST | 8.6 | 10.1 | 0.2 | 26.6 |
|  | RA-G1 | 16.1 | 18.0 | 27.4 | 6.4 |
|  | RA-G2 | 11.0 | 12.8 | 17.0 | 2.8 |
|  | RA-G3 | 2.5 | 3.6 | 3.3 | 0.5 |
|  | GRA | 29.6 | 34.4 | 47.7 | 9.7 |
|  | X | 88.0 | 87.8 | 86.5 | 89.9 |
| (GRA + RA)/X |  | 0.56 | 0.66 | 0.92 | 0.15 |
| GRA/RA |  | 1.50 | 1.46 | 1.47 | 2.31 |

Test Examples 1 to 3 and Comparative Test Examples 1 to 4

(Evaluation of Sweetness Intensity)

Using the sweetener 1, the sweetener 2, the sweetener 3 and the sweetener 1' as well as the Stevia extract A1, the Stevia extract A2 and the Stevia extract B used as the raw material, the sweetness intensity was evaluated.

Evaluation of Sweetness Intensity

A sugar solution having a concentration of 8% was prepared and used as an aqueous standard sugar solution. Aqueous sample solutions of the sweetener 1, the sweetener 2, the sweetener 3 and the sweetener 1' as well as the Stevia extract A1, the Stevia extract A2, and the Stevia extract B used as the raw material in concentrations ranging from 0.025% to 0.080% (8 different concentrations differing by 0.005%) were prepared. The test for sweetness was conducted on these solutions. Each of the sample solutions was compared with each of the standard solutions by 20 panelists at 25° C. using a two-point comparison process. The results are shown in Table 9 and Table 10.

TABLE 9

| | Test Example | | | | | | | | Comparative Test Example | | |
|---|---|---|---|---|---|---|---|---|---|---|---|
| | 1<br>Sweetener 1 | | | 2<br>Sweetener 2 | | | 3<br>Sweetener 3 | | | 1<br>Sweetener 1' | | |
| Sample concentration | more | same | less | more | same | less | more | same | less | more | same | less |
| 0.040% | 0 | 0 | 20 | 0 | 0 | 20 | 0 | 0 | 20 | 0 | 0 | 20 |
| 0.045% | 0 | 0 | 20 | 0 | 0 | 20 | 0 | 2 | 18 | 0 | 0 | 20 |
| 0.050% | 0 | 2 | 18 | 0 | 2 | 18 | 4 | 12 | 4 | 0 | 0 | 20 |
| 0.055% | 0 | 8 | 12 | 2 | 13 | 5 | 9 | 11 | 0 | 0 | 2 | 18 |
| 0.060% | 5 | 12 | 3 | 2 | 15 | 3 | 19 | 1 | 0 | 2 | 9 | 9 |
| 0.065% | 9 | 8 | 3 | 10 | 9 | 1 | 20 | 0 | 0 | 2 | 15 | 3 |
| 0.070% | 14 | 6 | 0 | 17 | 3 | 0 | 20 | 0 | 0 | 10 | 9 | 1 |
| 0.075% | 17 | 3 | 0 | 19 | 1 | 0 | 20 | 0 | 0 | 17 | 3 | 0 |
| 0.080% | 20 | 0 | 0 | 20 | 0 | 0 | 20 | 0 | 0 | 20 | 0 | 0 |

TABLE 10

| Comparative Test Example Sample | 2<br>Stevia extract A1 | | | 3<br>Stevia extract A2 | | | 4<br>Stevia extract A3 | | |
|---|---|---|---|---|---|---|---|---|---|
| concentration | more | same | less | more | same | less | more | same | less |
| 0.025% | 0 | 0 | 20 | 0 | 0 | 20 | 0 | 0 | 20 |
| 0.030% | 0 | 0 | 20 | 0 | 4 | 16 | 0 | 0 | 20 |

TABLE 10-continued

| Comparative Test Example Sample | 2 Stevia extract A1 | | | 3 Stevia extract A2 | | | 4 Stevia extract A3 | | |
|---|---|---|---|---|---|---|---|---|---|
| concentration | more | same | less | more | same | less | more | same | less |
| 0.035% | 0 | 3 | 17 | 1 | 15 | 4 | 0 | 0 | 20 |
| 0.040% | 2 | 9 | 9 | 12 | 8 | 0 | 0 | 4 | 16 |
| 0.045% | 6 | 10 | 4 | 18 | 2 | 0 | 7 | 9 | 4 |
| 0.050% | 17 | 3 | 0 | 20 | 0 | 0 | 10 | 10 | 0 |
| 0.055% | 19 | 1 | 0 | 20 | 0 | 0 | 18 | 2 | 0 |
| 0.060% | 20 | 0 | 0 | 20 | 0 | 0 | 20 | 0 | 0 |

As is apparent from the results shown in Table 9 and Table 10, the concentration corresponding to the sugar concentration of 8% was 0.060% (sweetness intensity: 133 times) for sweetener 1, 0.0575% (sweetness intensity: 139 times) for sweetener 2, 0.0525% (sweetness intensity: 152 times) for sweetener 2, or 0.0650% (sweetness intensity: 123 times) for sweetener 1'. The concentration corresponding to the sugar concentration of 8% was 0.0425% (sweetness intensity: 188 times) for Stevia extract A1, 0.0350% (sweetness intensity: 229 times) for Stevia extract A2, or 0.0475% (sweetness intensity: 168 times) for Stevia extract B.

As is apparent from these results, the sweetness intensity of each of the sweeteners resulting from the β-1,4 bonding of a galactosyl group to stevioside maintains about 70% of the sweetness intensity of each of Stevia extract A1, Stevia extract A2 and Stevia extract B as the raw material and, therefore, these sweeteners have a high sweetness intensity.

Test Examples 4 to 6 and Comparative Test Example 5

(Evaluation of Sweetness)

Using the sweetener 1, the sweetener 2, the sweetener 3 and the sweetener 1', the sweetness was evaluated.

Aqueous solutions of the sweeteners each having a concentration corresponding to that of the aqueous solution having a concentration of 8% were prepared. The mildness experienced as a pre-taste of the sweetness, disagreeable taste such as bitterness or astringency experienced as an after-taste, head-taste of the sweetness, after-taste, and sharpness were evaluated by comparing with sugar having the same sweetness intensity. The results are shown in Table 11.

As is apparent from the results shown in Table 11, the sweetener 1' has almost the same sharpness, but is inferior in bitterness, after-taste of sweetness, and head-taste of sweetness, and therefore the effect of improving the taste quality is low. In contrast, regarding the sweetener 1, the sweetener 2 and the sweetener 3, the mildness as pre-taste was improved and disagreeable taste such as bitterness or astringency as after-taste could be further improved as compared with the sweetener 1', and also the sweetness was improved to a sweetness with good quality which is generally similar to that of sugar.

Application Example 1

30 g of granulated sugar, 170 g of isomerized sugar, 3.0 g of citric acid, 0.20 g of sodium citrate, 0.20 g of soda pop extract, 0.22 g of a sweetener 1 and carbonated water were mixed to prepare 2 liters of soda pop. As a result of a taste test by 20 panelists, the resulting soda pop using the sweetener 1 exhibited light sweetness and sharp after-taste of sweetness.

Comparative Application Example 1

In the same manner as in Application Example 1, except that 0.30 g of the sweetener 1' was used in place of 0.22 g of the sweetener 1, soda pop was prepared. In the same manner as in Application Example 1, the taste test was conducted. As a result, the resulting soda pop exhibited delayed head-taste of the sweetness and prolonged after-taste of sweetness.

TABLE 11

| | | Test Example 1 Sweetener 1 | | | Test Example 2 Sweetener 2 | | | Test Example 3 Sweetener 3 | | | Comparative Test Example 5 Sweetener 1' | | |
|---|---|---|---|---|---|---|---|---|---|---|---|---|---|
| Test Example | | better | same | worse | better | same | worse | better | same | worse | better | same | worse |
| Sweetness | Mildness | 2 | 17 | 1 | 0 | 19 | 1 | 3 | 17 | 0 | 0 | 9 | 11 |
| | Bitterness | 1 | 16 | 3 | 0 | 16 | 4 | 0 | 18 | 2 | 0 | 2 | 18 |
| | Head-taste of sweetness | 1 | 15 | 4 | 3 | 15 | 2 | 1 | 19 | 0 | 0 | 6 | 14 |
| | After-taste of sweetness | 2 | 16 | 2 | 2 | 16 | 2 | 3 | 16 | 1 | 0 | 6 | 14 |
| | Sharpness | 2 | 15 | 3 | 3 | 15 | 2 | 3 | 16 | 1 | 1 | 14 | 5 |
| | General comparison with sugar | 2 | 17 | 1 | 1 | 18 | 1 | 2 | 17 | 1 | 1 | 8 | 11 |

Application Example 2

11 g of granulated sugar, 141 g of isomerized sugar, 20 g of powdered coffee, 76 g of skim milk powder, 0.26 g of a sweetener 1 and warm water were mixed to prepare 2 liters of a coffee drink. As a result of a taste test by 20 panelists, the resulting coffee drink exhibited good sweetness in conformity with the bitterness of the coffee drink.

Comparative Application Example 2

In the same manner as in Application Example 2, except that 0.30 g of the sweetener 1' was used in place of 0.26 g of the sweetener 1, a coffee drink was prepared. In the same manner as in Application Example 2, the taste test was conducted. As a result, the resulting soda coffee drink was unnatural because the timing of the experience of the bitterness of the coffee drink does not correspond to the timing of the experience of the sweetness.

Reference Example 3

Conformation of Presence of β-1,4-galactosyl Rebaudioside A)

Under the same conditions used in the analysis by liquid chromatography of Example 1, a sweetener 3 was fractioned by liquid chromatography and the estimated peak fractions of β-1,4-galactosyl rebaudioside A was isolated. These fractions were converted into powders, which were dissolved in pure water to prepare an aqueous 2% solution. After measuring out 1 ml of this solution into a test tube, β-D-glucosidase (a product of Wako Pure Chemical Industries, Ltd.) was added in a concentration of 10 units/ml. Then, the reaction was carried out at 30° C. or 24 hours.

The resulting β-D-glucosidase-treated product was spotted on a silica gel plate 60F254 TLC plate (a product of Merck & Co.). As a control, stevioside, rebaudioside A, fractioned β-1,4-galactosyl rebaudioside A and D-galactose were also spotted. Then, the plate was developed with a mixed solvent composed of chloroform, methanol and water in a volume ratio of 30:20:4. After full air-drying, concentrated sulfuric acid containing 0.2% of anisaldehyde was sprayed onto the plate and heated at 100° C. for 10 minutes to induce coloration. The resulting chromatogram is shown in FIG. 2.

Figure 2:
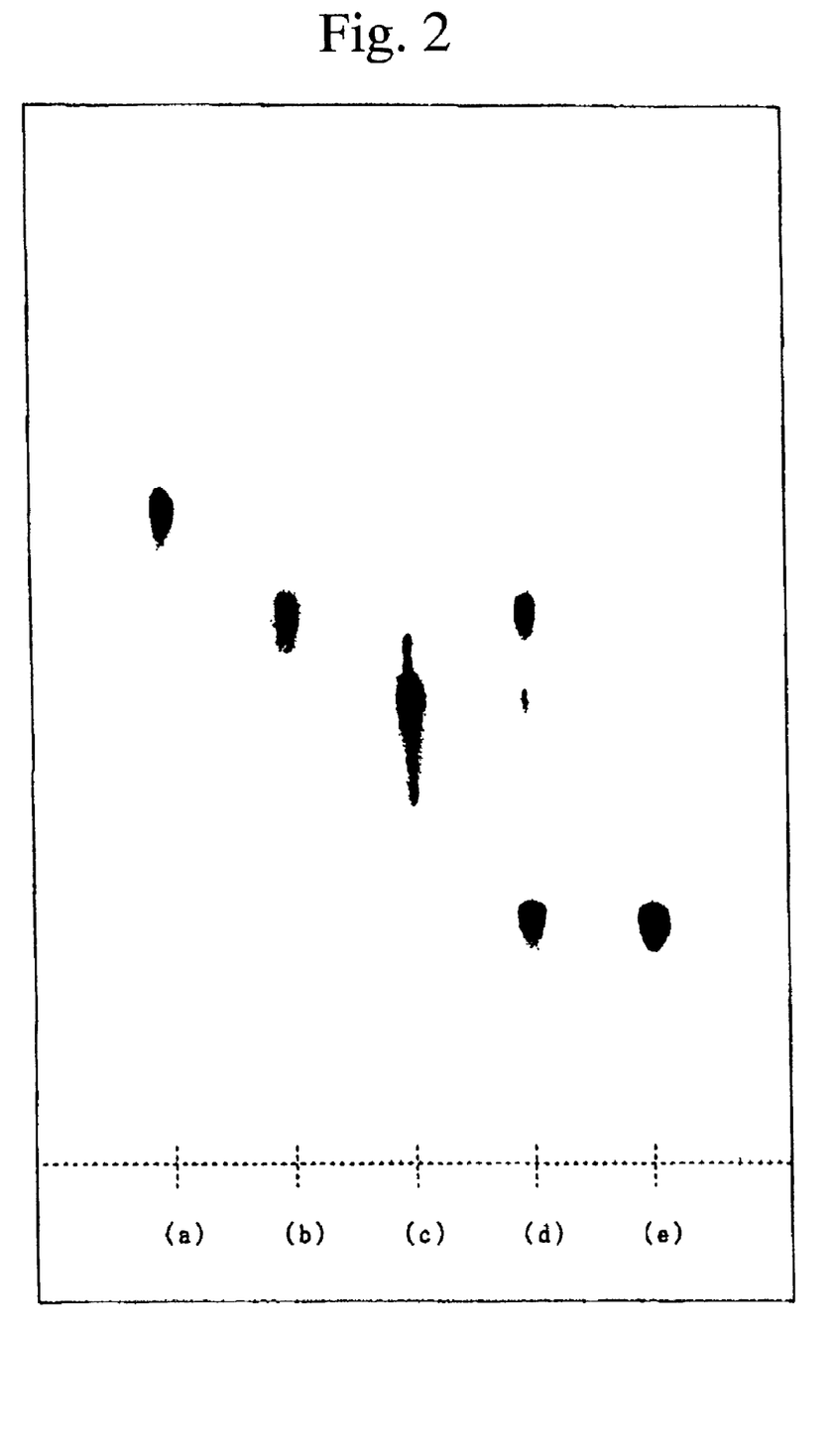
FIG. 2 is a graph showing a thin-layer chromatogram of β-1,4-galactosyl rebaudioside A.

In FIG. 2, the reference symbols (a) denotes a sample obtained by development of a spot ascribed to stevioside, (b) denotes chromatogram obtained by development of a spot of rebaudioside A, (c) denotes a sample obtained by development of a spot of an estimated component of preparative β-1,4-galactosyl rebaudioside A, (d) denotes a sample obtained by development of a spot of a product of β-1,4-galactosyl rebaudioside A treated with preparative β-D-glucosidase, and (e) denotes a sample obtained by development of a spot of D-galactose.

As shown in FIG. 2, in the case of the sample (c) obtained by spotting an estimated peak fraction of β-1,4-galactosyl rebaudioside A due to preparative HPLC, a continuous spot at an Rf value ranging from about 0.35 to about 0.53 appeared. In the case of the sample (d) obtained by spotting after treatment with β-D-glucosidase, a continuous spot at an Rf value ranging from about 0.35 to about 0.53 nearly disappeared and a spot at an Rf value of 0.48 remained and, furthermore, a spot at an Rf value of 0.55 corresponding to the spot (b) of rebaudioside A and a spot at an Rf value of 0.25 corresponding to the spot (e) of D-galactose appeared additionally.

It was confirmed from the above results that a continuous spot at an Rf value ranging from about 0.35 to about 0.53 is ascribed to β-1,4-galactosyl rebaudioside A derivative, which is a combined substance of rebaudioside A and D-galactose.

What is claimed is:

1. A sweetener which contains steviol glucosides comprising
   β-1,4-galactosyl rebaudioside A having one to three β-1,4-bonded galactosyl groups in a molecule and
   rebaudioside A,
   wherein the following expressions (1) and (2) are satisfied:

$$[(GRA+RA)/(X)] \geq 0.4 \tag{1}$$

$$[(GRA)/(RA)] \geq 1.0 \tag{2}$$

wherein GRA represents the weight percentage of the β-1,4-galactosyl rebaudioside A having one to three β-1,4-bonded galactosyl groups in a molecule, RA represents the weight percentage of the rebaudioside A, and X represents the weight percentage of the steviol glucosides; and
   at least one of the β-1,4-bonded galactosyl groups is bonded to the 13-G1 glucose residue of rebaudioside A, or is bonded to at least one of the 13-G2 and 13-G3 glucose residues, of rebaudioside A.

2. A sweetener according to claim 1, wherein the following expressions (3) and (4) are satisfied:

$$0.95 \geq [(GRA+RA)/(X)] \geq 0.5 \tag{3}$$

$$10.0 \geq [(GRA)/(RA)] \geq 1.1 \tag{4}.$$

3. The sweetener according to claim 1 or 2, wherein the steviol glucosides further comprise
   β-1,4-galactosyl stevioside having one to two β-1,4-bonded galactosyl groups in a molecule and
   stevioside,
   and the following expression (5) is satisfied:

$$[(GRA+RA)/(GST+ST)] \geq 1.0 \tag{5}$$

wherein GST represents the weight percentage of the β-1,4-galactosyl stevioside having one to two β-1,4-bonded galactosyl groups in a molecule, and ST represents the weight percentage of the stevioside.

4. A sweetener according to claim 1, wherein the steviol glucosides further comprise
   β-1,4-galactosyl stevioside having one to two β-1,4-bonded galactosyl groups in a molecule and
   stevioside,
   and the following expressions (3), (6) and (7) are satisfied:

$$0.95 \geq [(GRA+RA)/(X)] \geq 0.5 \tag{3}$$

$$5.0 \geq [(GRA)/(RA)] \geq 1.1 \tag{6}$$

$$[(GRA+RA)/(GST+ST)] \geq 1.5 \tag{7}$$

wherein GST represents the weight percentage of the β-1,4-galactosyl stevioside having one to two β-1,4-bonded galactosyl groups in a molecule, and ST represents the weight percentage of the stevioside.

5. A sweetener according to claim 1, wherein the β-1,4-galactosyl rebaudioside A includes two or three β-1,4-bonded galactosyl groups.

6. A sweetener according to claim 1, wherein the β-1,4-bonded galactosyl groups are a 13-1,4-bonded galactosyl group bonded to a glucose residue bonded at the 13-position of a steviol skeleton of rebaudioside A and a β-1,4-bonded galactosyl group bonded to a glucose residue bonded at the 19-position of a steviol skeleton of rebaudioside A.

7. A process for preparing a sweetener, the process comprising allowing a β-1,4-galactosyl transferase to react on an aqueous solution containing a Stevia extract containing 40% by weight or more of rebaudioside A and a β-1,4-galactosyl sugar compound in a 5- to 20-fold amount based on the solid content of the Stevia extract, wherein the β-1,4-galactosyl transferase is reacted to provide at least one f3-1,4-bonded galactosyl group which is bonded to the 13-G1 glucose residue of rebaudioside A, or is reacted to provide at least one β-1,4-bonded galactosyl group which is bonded to at least one of the 13-G2 and 13-G3 glucose residues of rebaudioside A.

8. A process for preparing a sweetener according to claim 7, wherein the solid content of the Stevia extract containing 40% by weight or more of rebaudioside A in the aqueous solution is from 1 to 5% by weight and the β-1,4-galactosyl transferase is used in an amount of 1 to 1000 units based on 1 g of the solid content of the Stevia extract.

9. A process for preparing a sweetener according to claim 7 or 6, wherein the Stevia extract containing 40% by weight or more of rebaudioside A is a Stevia extract containing rebaudioside A in a 1.5-fold amount or more based on the weight of stevioside.

10. A process for preparing a sweetener according to claim 9, wherein the β-1,4-galactosyl sugar compound is lactose.

11. A process for preparing a sweetener according to claim 9, wherein the β-1,4-galactosyl transferase is an enzyme derived from microorganisms of the genus *Bacillus*.

12. A process for preparing a sweetener according to claim 7, wherein the sweetener prepared is a sweetener which contains steviol glucosides comprising β-1,4-galactosyl rebaudioside A having one to three β-1,4-bonded galactosyl groups per molecule and rebaudioside A, and the sweetener satisfies the following expressions (1) and (2):

$$[(GRA+RA)/(X)] \geq 0.4 \quad (1)$$

$$[(GRA)/(RA)] \geq 1.0 \quad (2)$$

wherein GRA represents the weight percentage of the β-1,4-galactosyl rebaudioside A having one to three β-1,4-bonded galactosyl groups per molecule, RA represents the weight percentage of the rebaudioside A, and X represents the weight percentage of the steviol glucosides.

13. A process for preparing a sweetener according to claim 7, wherein the Stevia extract contains 50% by weight or more of rebaudioside A.

14. A process for preparing a sweetener according to claim 7, wherein the β-1,4-galactosyl transferase is reacted to provide a β-1,4-bonded galactosyl rebaudio side A wherein two or more β-1,4-bonded galactosyl groups are included.

15. A process for preparing a sweetener according to claim 5, wherein the β-1,4-galactosyl transferase is reacted to provide both groups of: a β-1,4-bonded galactosyl group bonded to a glucose residue bonded at the 13-position of a steviol skeleton of rebaudioside A; and a 13-1,4-bonded galactosyl group bonded to a glucose residue bonded at the 19-position of a steviol skeleton of rebaudioside A.

16. A sweetener which contains steviol glucosides comprising:

at least one of β-1,4-galactosyl rebaudioside A having two to three β-1,4-bonded galactosyl groups in a molecule and rebaudioside A, wherein the following expressions (1) and (2) are satisfied:

$$[(GRA+RA)/(X)] \geq 0.4 \quad (1)$$

$$[GRA)/(RA)] \geq 1.0 \quad (2)$$

wherein GRA represents the weight percentage of the β-1,4-galactosyl rebaudioside A having two to three β-1,4-bonded galactosyl groups in a molecule, RA represents the weight percentage of the rebaudioside A, and X represents the weight percentage of the steviol glucosides.

17. A sweetener according to claim 16, wherein the following expressions (3) and (4) are satisfied:

$$0.95 \geq [(GRA+RA)/(X)] \geq 0.5 \quad (3)$$

$$10.0 \geq [(GRA)/(RA)] \geq 1.1 \quad (4).$$

18. The sweetener according to claim 16, wherein the steviol glucosides further comprise:

β-1,4-galactosyl stevio side having one to two β-1,4-bonded galactosyl groups in a molecule and stevioside, and the following expression (5) is satisfied:

$$[(GRA+RA)/(GST+ST)] \geq 1.0 \quad (5)$$

wherein GST represents the weight percentage of the β-1,4-galactosyl stevioside having one to two β-1,4-bonded galactosyl groups in a molecule, and ST represents the weight percentage of the stevioside.

19. A sweetener according to claim 16, wherein the steviol glucosides further comprise:

β-1,4-galactosyl stevioside having one to two β-1,4-bonded galactosyl groups in a molecule and stevioside, and the following expressions (3), (6) and (7) are satisfied:

$$0.95 \geq [(GRA+RA)/(X)] \geq 0.5 \quad (3)$$

$$5.0 \geq [(GRA)/(RA)] \geq 1.1 \quad (6)$$

$$[(GRA+RA)/(GST+ST)] \geq 1.5 \quad (7)$$

wherein GST represents the weight percentage of the β-1,4-galactosyl stevioside having one to two β-1,4-bonded galactosyl groups in a molecule, and ST represents the weight percentage of the stevioside.

* * * * *